(12) United States Patent
Sano et al.

(10) Patent No.: US 8,488,249 B2
(45) Date of Patent: *Jul. 16, 2013

(54) OPTICAL ELEMENT, IMAGING DEVICE, AND METHOD OF DRIVING THE OPTICAL ELEMENT

(75) Inventors: Yukihiro Sano, Gifu (JP); Keita Kaifu, Tokyo (JP); Kazuhiro Tanaka, Tokyo (JP); Yukihiro Mitsuda, Gifu (JP)

(73) Assignee: Sony Corporation, Tokyo (JP)

( * ) Notice: Subject to any disclaimer, the term of this patent is extended or adjusted under 35 U.S.C. 154(b) by 965 days.

This patent is subject to a terminal disclaimer.

(21) Appl. No.: 12/565,908

(22) Filed: Sep. 24, 2009

(65) Prior Publication Data

US 2010/0079838 A1 Apr. 1, 2010

(30) Foreign Application Priority Data

Sep. 26, 2008 (JP) ................................. 2008-249241

(51) Int. Cl.
*G02B 1/06* (2006.01)
*G02B 3/12* (2006.01)

(52) U.S. Cl.
USPC .......................................... 359/666; 359/665

(58) Field of Classification Search
USPC ................................. 359/665–667
See application file for complete search history.

(56) References Cited

U.S. PATENT DOCUMENTS 7,787,190 B2 * 8/2010 Mitsuda et al. ............... 359/666

FOREIGN PATENT DOCUMENTS

| JP | 2001-228307 | 8/2001 |
| JP | 2006-243169 | 9/2006 |
| JP | 2006-250967 | 9/2006 |
| JP | 2006-250977 | 9/2006 |
| JP | 2007-225779 | 9/2007 |
| JP | 2008-170858 | 7/2008 |

OTHER PUBLICATIONS

Japanese Office Action for corresponding JP2008-249241 issued on May 18, 2010.

* cited by examiner

*Primary Examiner* — Scott J Sugarman
(74) *Attorney, Agent, or Firm* — K&L Gates LLP

(57) ABSTRACT

An optical element includes a first liquid having polarity or electrical conductivity, a second liquid that is immiscible with the first liquid, a first substrate portion, a second substrate portion, a sidewall portion connecting the first substrate portion to the second substrate portion, and an accommodating portion constituted by the first substrate portion, the second substrate portion, and the sidewall portion and sealing the first liquid and the second liquid therein. The first substrate portion includes a first electrode, the second substrate portion includes a second electrode, and the sidewall portion includes a third electrode.

10 Claims, 14 Drawing Sheets

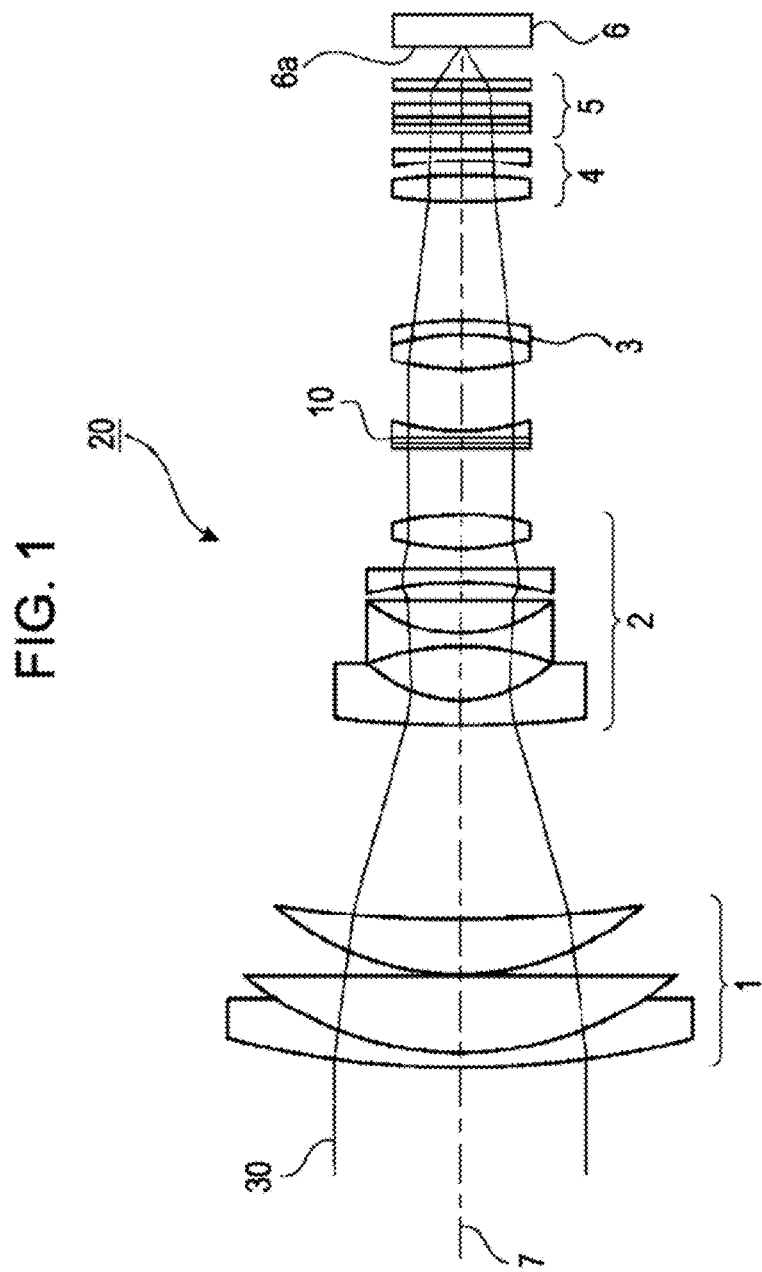

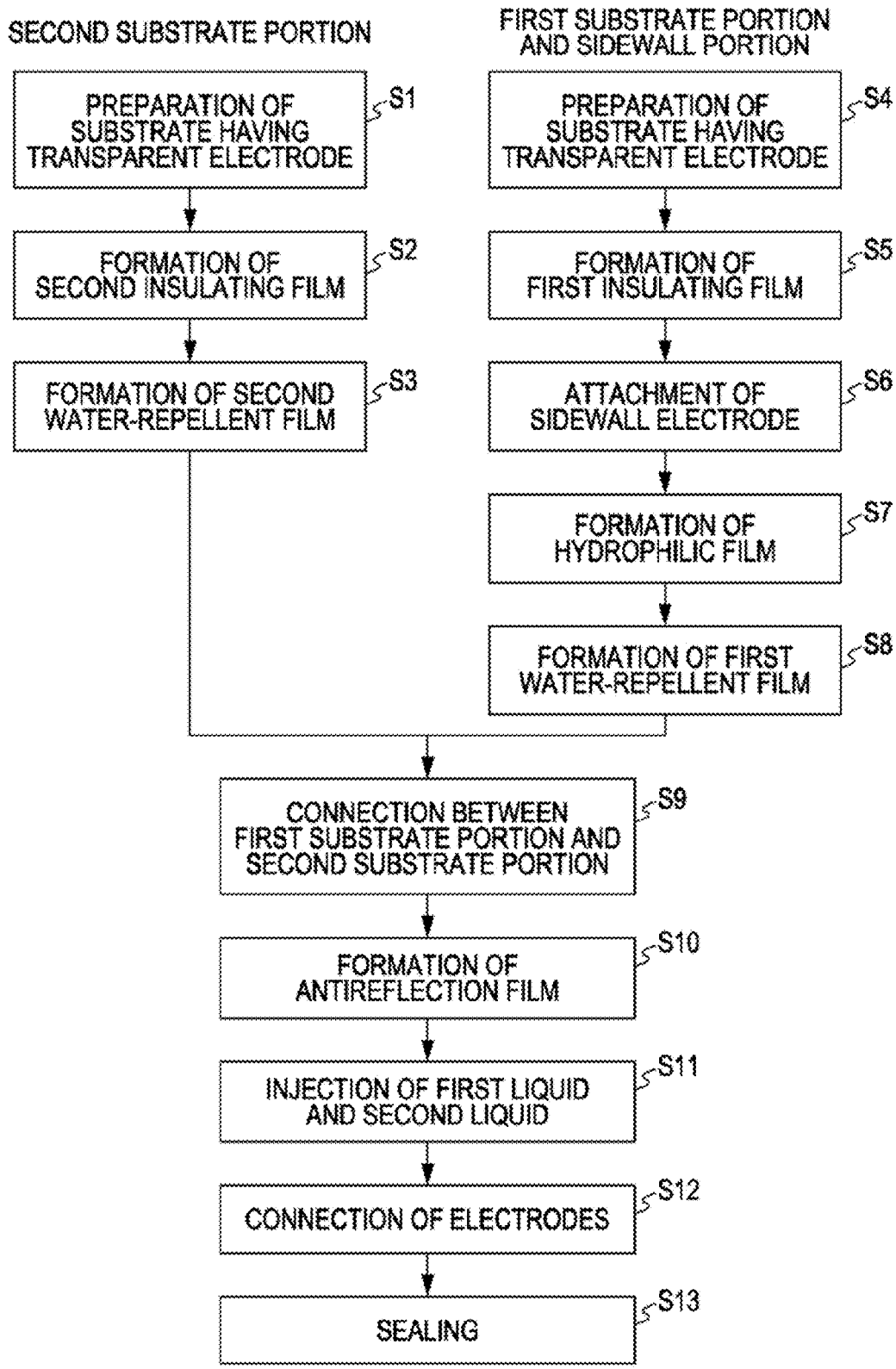

OPTICAL ELEMENT, IMAGING DEVICE, AND METHOD OF DRIVING THE OPTICAL ELEMENT

CROSS REFERENCES TO RELATED APPLICATIONS

The present application claims priority to Japanese Priority Patent Application JP 2008-249241 filed in the Japan Patent Office on Sep. 26, 2008, the entire content of which is hereby incorporated by reference.

BACKGROUND

The present application relates to an optical element, an imaging device, and a driving method. More specifically, the present application relates to an optical element utilizing an electrowetting phenomenon, an imaging device including the optical element, and a method of driving the optical element.

Recently, various optical devices (such as lenses) utilizing an electrowetting phenomenon (electrocapillarity) have been proposed. Such optical devices use a property that the shape of an interface between two liquids enclosed in the optical devices and immiscible with each other is changed through the electrowetting phenomenon. As one of such optical devices, an optical element (aperture mechanism), a so-called liquid iris, configured to control the amount of light to be transmitted using the electrowetting phenomenon has been proposed (refer to, for example, Japanese Unexamined Patent Application Publication Nos. 2006-250967 and 2006-250977).

According to the liquid irises disclosed in Japanese Unexamined Patent Application Publication Nos. 2006-250967 and 2006-250977, an electrically conductive first liquid, and a second liquid that has the same specific gravity as that of the first liquid, that is immiscible with the first liquid, and that has a transmittance higher than that of the first liquid are enclosed inside the liquid irises. Furthermore, a thin film (hydrophilic film) having high affinity with the first liquid and a thin film (water-repellent film) having high affinity with the second liquid are provided on the inner wall of an accommodating chamber that accommodates the first and second liquids. Accordingly, in a static state (in a state in which a liquid iris is not driven), the first liquid is disposed on the hydrophilic film side and the second liquid is disposed on the water-repellent film side in the accommodating chamber.

In each of the liquid irises disclosed in Japanese Unexamined Patent Application Publication Nos. 2006-250967 and 2006-250977, a voltage is applied between an electrode provided on a sidewall of the liquid iris and a transparent electrode provided on an end wall on the light-emitting side to change the shape of the interface between the first liquid and the second liquid through the electrowetting phenomenon. Consequently, a part of the second liquid is pressed onto an end wall of the light-incident side to form an opening through which light is transmitted to the light-incident side of the liquid iris. The size of this opening can be controlled by changing the magnitude of the voltage applied.

SUMMARY

In the above-described liquid iris utilizing the electrowetting phenomenon, when the shape of the interface between the first liquid and the second liquid is changed (when the opening is formed), a voltage is applied. On the other hand, when the shape of the interface between the first liquid and the second liquid is returned to the original shape (static state), the voltage is turned off. Specifically, in the liquid iris in the related art, the opening/closing operation of the opening is performed by a single-side driving system.

In such a single-side driving system, when the shape of the interface between the first liquid and the second liquid is changed from the shape in the static state, an external force due to the electrowetting phenomenon acts on the interface by the application of the voltage. Therefore, in this case, the rate of change in the shape of the interface (the operation speed of the liquid iris) is high. However, when the shape of the interface is returned to the shape in the original static state (when the opening is closed), the interface is operated by a restoration force due to the affinity between the water-repellent film and the second liquid in the accommodating chamber without application of an voltage. Accordingly, there is a problem that the rate of change in the shape of the interface is low.

In an optical element using the electrowetting phenomenon, it is desirable to increase the operation speed when the shape of the interface between a first liquid and a second liquid is returned to the shape in the original static state.

An optical element according to an embodiment includes a first liquid having polarity or electrical conductivity and a second liquid that is immiscible with the first liquid. The optical element according to an embodiment further includes a first substrate portion, a second substrate portion, a sidewall portion connecting the first substrate portion to the second substrate portion, and an accommodating portion constituted by the first substrate portion, the second substrate portion, and the sidewall portion and sealing the first liquid and the second liquid therein. The first substrate portion includes a first substrate having optical transparency, a first electrode disposed on a surface of the first substrate and having optical transparency, and a first insulating film disposed on the first electrode and having optical transparency. Furthermore, the first substrate portion includes a first film disposed on the first insulating film and having higher affinity with the first liquid than with the second liquid and optical transparency, and a second film disposed at the center of the first film and having higher affinity with the second liquid than with the first liquid and optical transparency. The second substrate portion includes a second substrate having optical transparency, a second electrode disposed on a surface of the second substrate and having optical transparency, and a second insulating film disposed on the second electrode and having optical transparency. Furthermore, the second substrate portion includes a third film disposed on the second insulating film and having higher affinity with the second liquid than with the first liquid and optical transparency. In addition, the sidewall portion includes a third electrode and connects the first substrate portion to the second substrate portion so that the first film and the third film face each other.

An imaging device according to an embodiment includes the optical element according to an embodiment and a power supply unit configured to apply a voltage between the first electrode and the third electrode or between the second electrode and the third electrode of the optical element. The imaging device further includes a lens unit configured to focus incident light and an imaging element on which the incident light is focused through the optical element and the lens unit.

In a method of driving an optical element according to an embodiment, the optical element is driven as follows. First, a voltage is applied between the second electrode and the third electrode of the optical element according to an embodiment to change the shape of the interface between the first liquid and the second liquid. Subsequently, when the changed interface between the first liquid and the second liquid to the original shape, a voltage is applied between the first electrode and the third electrode.

As described above, in the optical element according to an embodiment, the first substrate portion includes a first electrode, the second substrate portion includes the second electrode, and the sidewall portion includes the third electrode. In this case, for the optical element (first liquid), a voltage can be applied between the first electrode and the third electrode or between the second electrode and the third electrode. In an embodiment, when the interface between the first liquid and the second liquid is changed from the shape in the static state, a voltage is applied between the second electrode and the third electrode as in the related art. When the shape of the interface between the first liquid and the second liquid is returned to the original shape in the static state, a voltage is applied between the first electrode and the third electrode. That is, in an embodiment, when the changed interface between the first liquid and the second liquid is returned to the original shape in the static state, an external force is applied to the interface between the first liquid and the second liquid through an electrowetting phenomenon to return to the original shape in the static state.

According to an embodiment, when a changed shape of the interface between the first liquid and the second liquid is returned to a shape in the static state, an external force due to the electrowetting phenomenon is provided to the interface between the first liquid and the second liquid. Therefore, according to an embodiment, it is possible to increase the operation speed when the changed shape of the interface between the first liquid and the second liquid is returned to the shape in the static state.

Additional features and advantages are described herein, and will be apparent from the following Detailed Description and the figures.

BRIEF DESCRIPTION OF THE FIGURES

FIG. 1 is a schematic structural view of an imaging device according to an embodiment;

FIG. 3 is a flowchart showing a procedure for making the liquid iris of the embodiment;

DETAILED DESCRIPTION

Figure 2A:
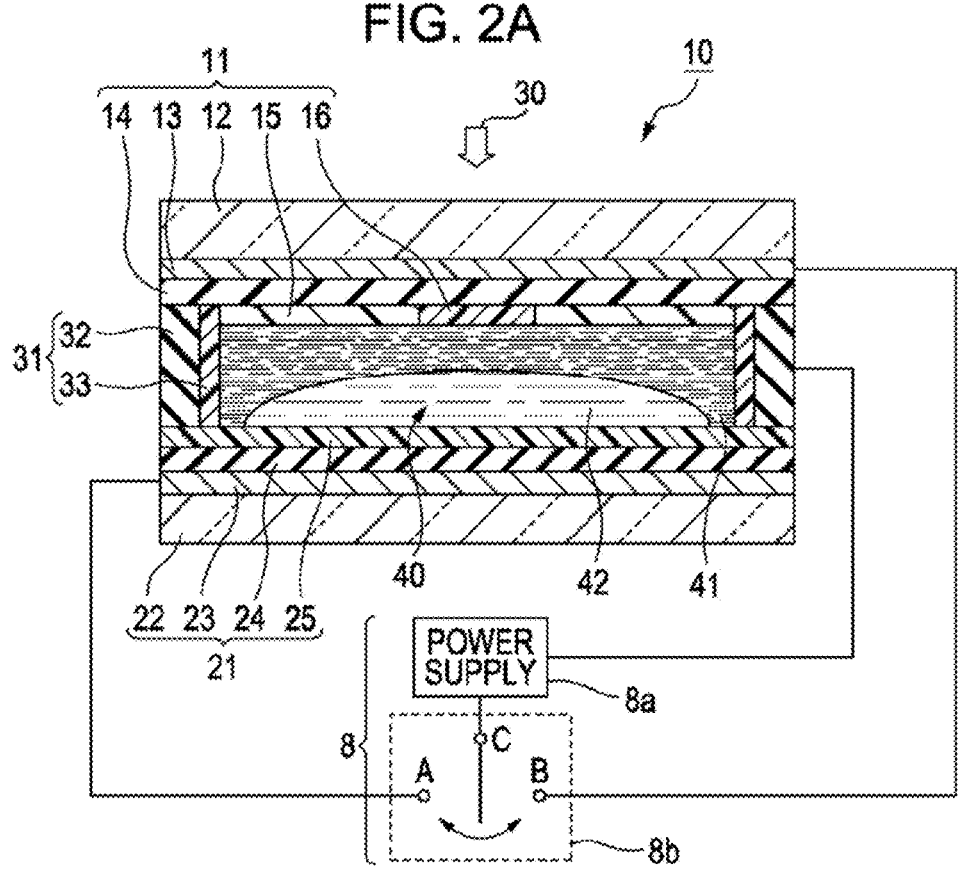
FIG. 2A is a schematic cross-sectional view of a liquid iris of the embodiment.

The present application will now be described with reference to the application drawings according to an embodiment. As described below, a liquid iris (aperture mechanism) used in an imaging device will be described as an example of an optical element according to an embodiment.

1. Structure of Imaging Device

FIG. 1 shows an example of the schematic structure of an imaging device to which a liquid iris of an embodiment is applied. FIG. 1 shows an example of an imaging device including a zoom mechanism. FIG. 1 mainly shows the structure of an optical system of the imaging device, and the structures of a portion configured to process an acquired image and a portion configured to perform a control process of the optical system are omitted. The embodiment can be applied also to an imaging device that does not include a zoom mechanism.

An optical system of an imaging device 20 includes a first lens unit 1, a second lens unit 2, a liquid iris 10, a third lens unit 3, a fourth lens unit 4, a filter 5, and an imaging element 6. The first lens unit 1, the second lens unit 2, the liquid iris 10, the third lens unit 3, the fourth lens unit 4, the filter 5, and the imaging element 6 are arranged in that order from the incident side of a light beam 30.

Among the first lens unit 1 to the fourth lens unit 4 for focusing incident light, the first lens unit 1 and the third lens unit 3 are attached so as to be fixed in a lens barrel (not shown). The second lens unit 2 is a lens unit for zooming and is attached to the lens barrel so as to move in a direction of an optical axis 7. The fourth lens unit 4 is a lens unit for focusing and is attached so as to move in the direction of the optical axis 7. The movement of the second lens unit 2 (for zooming) and the fourth lens unit 4 (for focusing) in the direction of the optical axis 7 is controlled by a control unit (not shown) in the imaging device 20.

The liquid iris 10 (optical element) adjusts an opening diameter (aperture diameter) of the liquid iris 10 at the light-incident side by utilizing an electrowetting phenomenon, whereby adjusting the amount of light beam 30 passing through the liquid iris 10. The opening diameter (aperture diameter) of the liquid iris 10 at the light-incident side is adjusted by changing the value of voltage applied to the liquid iris 10, and this adjustment is controlled by the control unit (not shown) in the imaging device 20. The specific structure and the operation of the liquid iris 10 will be described in detail below.

The filter 5 is constituted by an infrared cut filter, a low-pass filter, or the like. The imaging element 6 is constituted by, for example, charge coupled devices (CCD) or complementary metal oxide semiconductors (CMOS).

In the imaging device 20 of this embodiment, as shown in FIG. 1, the light beam 30 incident from the first lens unit 1 side is focused on an imaging surface 6*a* of the imaging element 6 through the above-mentioned various optical elements. An image data acquired in the imaging element 6 is subjected to a predetermined process by an image-processing unit (not shown) in the imaging device 20.

2. Structure of Liquid Iris

Figure 2B:
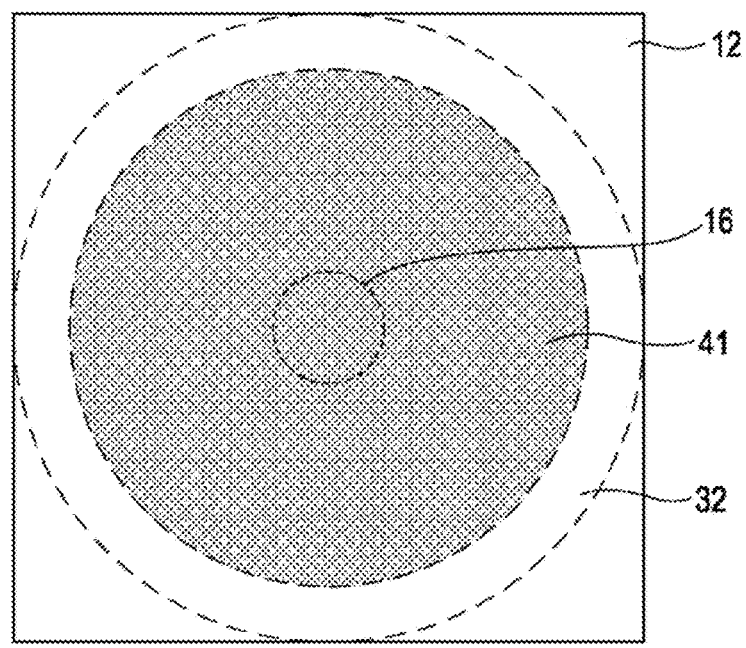
FIG. 2B is a top view of the liquid iris shown in FIG. 2A, viewed from the light-incident side.

FIGS. 2A and 2B show the schematic structure of the liquid iris 10 of this embodiment. FIG. 2A is a schematic cross-sectional view of the liquid iris 10 when no voltage is applied (in the static state), and FIG. 2B is a top view of the liquid iris 10 viewed from the light-incident side at that time.

The liquid iris 10 includes a first substrate portion 11, a second substrate portion 21, and a sidewall portion 31 connecting the first substrate portion 11 to the second substrate portion 21. A first liquid 41 and a second liquid 42 are hermetically enclosed in an accommodating chamber 40 (accommodating portion) constituted by the first substrate portion 11, the second substrate portion 21, and the sidewall portion 31.

As the first liquid 41, a liquid having polarity or electrical conductivity is used. Any liquid having such a property can be used as the first liquid 41. For example, water (specific gravity: 1, refractive index: 1.333) can be used as the first liquid 41. Instead of water, a mixed liquid of water and ethanol, a mixed liquid of water, ethanol, and ethylene glycol, a mixed liquid prepared by adding common salt to a mixed liquid of water and ethanol, or the like can also be used as the first liquid 41. In this embodiment, in order to decrease optical transparency of the first liquid 41, the first liquid 41 is colored by mixing carbon black or the like. A dye other than carbon black may be used as a colorant.

As the second liquid 42, a liquid that is immiscible with the first liquid 41, that has substantially the same specific gravity and refractive index as those of the first liquid 41, that has an insulating property or nonpolarity, and that has optical transparency is used. Any liquid having such properties can be used as the second liquid 42. By adjusting the refractive index of the first liquid 41 to be substantially the same as the refractive index of the second liquid 42, refraction of light (lens effect) at the interface between the first liquid 41 and the second liquid 42 can be prevented or sufficiently decreased, thereby performing the operation of an aperture of the liquid iris 10 more reliably. Furthermore, by adjusting the specific gravity of the first liquid 41 to be substantially the same as the specific gravity of the second liquid 42, a change in the shape of the interface between the first liquid 41 and the second liquid 42 can be suppressed when the whole device is vibrated or tilted. Note that it is sufficient that the values of the specific gravity and refractive index of the first liquid 41 are close to those of the second liquid 42 to an extent that optical properties, a vibration resistance property etc. of the device are within allowable tolerances of the device. Since the second liquid 42 is not colored, the light transmittance of the second liquid 42 is higher than that of the first liquid 41.

When water is used as the first liquid 41, for example, silicone oil is used as the second liquid 42. There are various types of commercially available silicone oil having different specific gravities and refractive indices. Accordingly, in this embodiment, among various types of commercially available silicone oil, silicone oil having substantially the same specific gravity and refractive index as those of the first liquid 41 is selected and used as the second liquid 42. In order to make the specific gravity and the refractive index of the first liquid 41 to be closer to those of the second liquid 42, for example, a liquid prepared by mixing ethanol, ethylene glycol, common salt etc. with water is used as the first liquid 41, and the specific gravity and the refractive index of the first liquid 41 may be controlled by adjusting the mixing ratio of these.

The first substrate portion 11 includes a first substrate 12, a first electrode 13 disposed on the first substrate 12, a first insulating film 14 disposed on the first electrode 13, a hydrophilic film 15 disposed on the first insulating film 14, and a first water-repellent film 16 disposed at the center of the hydrophilic film 15.

The first substrate 12 is a square plate-shaped member composed of a light-transmissive material such as transparent glass and having a thickness of, for example, about 0.2 to 0.3 mm. Alternatively, a transparent synthetic resin material or the like may be used as the material of the first substrate 12. The first electrode 13 is a transparent electrode composed of indium tin oxide (ITO) or the like. The first electrode 13 is connected to a power supply unit 8 of the imaging device 20. More specifically, the power supply unit 8 includes a power supply 8*a* and a selector switch 8*b*, and the first electrode 13 is connected to a terminal B, which is one of terminals of the selector switch 8*b*. The first insulating film 14 is a dielectric film composed of polyvinylidene chloride, polyvinylidene fluoride, or the like.

The hydrophilic film 15 (first film) is a thin film having higher affinity with the first liquid 41 than with the second liquid 42. That is, the wettability of the first liquid 41 on the hydrophilic film 15 is larger than the wettability of the second liquid 42 on the hydrophilic film 15. In this embodiment, a polyvinyl alcohol resin, a polyacrylic acid resin, or the like is used as a material of the hydrophilic film 15. Any thin film having hydrophilicity and optical transparency may be used as the hydrophilic film 15.

The first water-repellent film 16 (second film) is a thin film (hydrophobic or lipophilic thin film) having higher affinity with the second liquid 42 than with the first liquid 41. That is, the wettability of the second liquid 42 on the first water-repellent film 16 is larger than the wettability of the first liquid 41 on the first water-repellent film 16. In this embodiment, a fluorocarbon resin or the like is used as a material of the first water-repellent film 16. Any thin film having lipophilicity and optical transparency may be used as the first water-repellent film 16.

The surface of the first water-repellent film 16 at the accommodating chamber 40 side is circular in shape (see FIG. 2B). The embodiment is not limited thereto, and the surface of the first water-repellent film 16 may have a shape other than a circular shape. However, as described below, in this embodiment, an opening that transmits light expands from the first water-repellent film 16 serving as a center. In this case, the planar shape of the opening is preferably a circular shape in consideration of the resolution. Therefore, in order to maintain the planar shape of the opening to be a circular shape, the surface of the first water-repellent film 16 is preferably a circular in shape.

Preferably, the diameter of the first water-repellent film 16 is as large as possible. As described below, in this embodiment, when the opening of the liquid iris 10 is closed, that is, when the shape of the interface between the first liquid 41 and the second liquid 42 is returned to the shape in the original static state, a voltage is applied between the first electrode 13 and a sidewall electrode 32 described below. In this step, the shape of the interface is returned to the shape in the original static state by a restoration force due to the affinity between the second liquid 42 and a second water-repellent film 25 described below and an external force acting on the interface between the first liquid 41 and the second liquid 42 through electrowetting on the first water-repellent film 16. Therefore, in this embodiment, when the opening of the liquid iris 10 is closed, it is necessary to sufficiently cause the electrowetting phenomenon on the first water-repellent film 16. According to an experiment made by the inventors of the present application, it was verified that as the diameter of the first water-repellent film 16 increases, the electrowetting phenomenon more readily occurred on the first water-repellent film 16. However, if the diameter or the first water-repellent film 16 excessively increases, the affinity between the first liquid 41 and the hydrophilic film 15 on a surface of the accommodating chamber 40 on the first substrate portion 11 side decreases. In this case, in the static state, it is difficult to maintain the interface between the first liquid 41 and the second liquid 42 to the state shown in FIG. 2A (the state in which the second liquid 42 is not in contact with a film on the first substrate portion 11 side). Therefore, the diameter of the first water-repellent film 16 is appropriately determined in consideration of the ease of occurrence of the electrowetting phenomenon on the first water-repellent film 16, maintaining the shape of the interface in the static state, and the like.

Furthermore, preferably, the thickness of the first water-repellent film 16 is substantially the same as the thickness of the hydrophilic film 15. Specifically, it is preferable that a surface of the first water-repellent film 16 on the accommodating chamber 40 side be flush with a surface of the hydrophilic film 15 on the accommodating chamber 40 side. The reason for this is as follows. If the thickness of the first water-repellent film 16 is different from the thickness of the hydrophilic film 15 and a difference in level is generated on the surface on the accommodating chamber 40 side, optical properties are changed by the portion including the difference in level and thus it is difficult to obtain desired optical properties. Furthermore, from the standpoint of the optical properties of the liquid iris 10, materials of the hydrophilic film 15 and the first water-repellent film 16 are preferably selected so that the refractive index of the hydrophilic film 15 is as close to the refractive index of the first water-repellent film 16 as possible. Note that it is sufficient that the values of the thickness and the refractive index of the hydrophilic film 15 are close to those of the first water-repellent film 16 to an extent that optical properties of the device are within allowable tolerances of the device.

The second substrate portion 21 includes a second substrate 22, a second electrode 23 disposed on the second substrate 22, a second insulating film 24 disposed of the second electrode 23, and a second water-repellent film 25 disposed on the second insulating film 24.

As in the first substrate 12, the second substrate 22 is a square plate-shaped member composed of a light-transmissive material such as transparent glass and having a thickness of, for example, about 0.2 to 0.3 mm. As in the first electrode 13, the second electrode 23 is a transparent electrode composed of ITO or the like. The second electrode 23 is connected to a terminal A, which is one of terminals of the selector switch 8b of the power supply unit 8. As in the first insulating film 14, the second insulating film 24 is a dielectric film composed of polyvinylidene chloride, polyvinylidene fluoride, or the like.

As in the first water-repellent film 16, the second water-repellent film 25 (third film) is a thin film having higher affinity with the second liquid 42 than with the first liquid 41. In this embodiment, the same material as the first water-repellent film 16 is used as a material of the second water-repellent film 25. Note that the material constituting the second water-repellent film 25 may be the same as or different from the material constituting the first water-repellent film 16.

The sidewall portion 31 includes a cylindrical sidewall electrode 32 and a hydrophilic film 33 provided on the inner wall surface of the sidewall electrode 32.

The sidewall electrode 32 is a cylindrical member (ring-shaped member) composed of a metal. In this embodiment, the sidewall electrode 32 is composed of a copper cylindrical member (copper tube) having an inner diameter of about 9 mm, an outer diameter of about 11 mm, and a height of about 1 mm. The sidewall electrode 32 is connected to the power supply 8a of the power supply unit 8. The sidewall electrode 32 includes an inlet (not shown) for injecting the first liquid 41 and the second liquid 42 into the liquid iris 10. The inlet is sealed from the outside of the sidewall electrode 32 using an adhesive member (not shown). A member prepared by depositing, for example, nickel, gold, platinum, or aluminum on a surface of a cylindrical member composed of copper or the like, that is, a surface-treated member may be used as the sidewall electrode 32. Alternatively, as the sidewall electrode 32, a member prepared by depositing, for example, copper, nickel, gold, platinum, or aluminum on a surface of a cylindrical member composed of glass, a resin, or the like may also be used.

The hydrophilic film 33 (fourth film) is a thin film having higher affinity with the first liquid 41 than with the second liquid 42. In this embodiment, as in the hydrophilic film 15 of the first substrate portion 11, a polyvinyl alcohol resin, a polyacrylic acid resin, or the like is used as a material of the hydrophilic film 33. Any thin film having hydrophilicity and optical transparency may be used as the hydrophilic film 33.

As shown in FIG. 2A, the power supply 8a connected to the sidewall electrode 32 is connected to a terminal C, which is one of terminals of the selector switch 8b. An alternating-current power supply is used as the power supply 8a in thus embodiment. Alternatively, a direct-current power supply may be used.

In the liquid iris 10 of this embodiment, in the case where no voltage is applied between the first electrode 13 and the sidewall electrode 32 or between the second electrode 23 and the sidewall electrode 32 (in the static state), the interface between the first liquid 41 and the second liquid 42 is in the state shown in FIG. 2A.

More specifically, the second water-repellent film 25 is provided over the entire surface on the second substrate portion 21 side of the accommodating chamber 40, and thus the second liquid 42 having higher wettability to the second water-repellent film 25 (affinity with the second water-repellent film 25) spreads over and contacts the second water-repellent film 25. Furthermore, as shown in FIG. 2A, the second liquid 42 spreads over the second water-repellent film 25 and approaches the sidewall portion 31, but does not contact the sidewall portion 31 because the hydrophilic film 33 is provided on the sidewall portion 31 side of the accommodating chamber 40.

On the other hand, the hydrophilic film 15 is mainly provided on the surface (except for the center) of the accommodating chamber 40 on the first substrate portion 11 side, and thus the first liquid 41 having higher wettability on the hydrophilic film 15 contacts films on the first substrate portion 11 side. Furthermore, the hydrophilic film 33 is provided on the surface of the accommodating chamber 40 on the sidewall portion 31 side, and thus the first liquid 41 also contacts the hydrophilic film 33. Consequently, as shown in FIG. 2A, the first liquid 41 is disposed between the second liquid 42 and the films (the hydrophilic film 15 and the first water-repellent film 16) on the first substrate portion 11 side of the accommodating chamber 40 so as to surround the second liquid 42. The shape of the interface between the first liquid 41 and the second liquid 42 is a curved surface. This shape is determined by the balance of the surface tensions of the first liquid 41 and the second liquid 42, and the interfacial tensions on the second water-repellent film 25.

In addition, in such a static state, the colored first liquid 41 is present between the second liquid 42 and the films on the first substrate portion 11 side of the accommodating chamber 40. Accordingly, as shown in FIG. 2B, when the liquid iris 10 is viewed from the incident side of the light beam 30, an opening through which the light beam 30 passes is not formed.

3. Method of Making Liquid Iris

Next, a method of making the liquid iris 10 of this embodiment will now be described with reference to FIG. 3. FIG. 3 is a flowchart showing a procedure for making the liquid iris 10.

First, a second substrate 22 composed of a light-transmissive material such as transparent glass is prepared. Next, a second electrode 23 composed of a light-transmissive electrically conductive material (e.g., ITO) is formed on a surface of the second substrate 22 by a vapor deposition method or the like so as to have a film thickness of about 30 nm (Step S1). Next, a dielectric film composed of polyvinylidene chloride, polyvinylidene fluoride, or the like and having a thickness in the range of, for example, about 1 to 5 µm is, for example, bonded onto the second electrode 23 with an adhesive to form a second insulating film 24 (Step S2).

Next, a fluorocarbon resin or the like is applied onto the second insulating film 24 by a spin-coating method or the like and baked at, for example, 150° C. to form a second water-repellent film 25 having a thickness in the range of about 10 to 30 nm (Step S3). A second substrate portion 21 is prepared by Steps S1 to S3 described above.

In addition, a first substrate portion 11 and a sidewall portion 31 are prepared as follows in parallel with Steps S1 to S3. First, a first substrate 12 composed of a light-transmissive material such as transparent glass is prepared. Next, a first electrode 13 composed of a light-transmissive electrically conductive material (e.g., ITO) is formed on a surface of the first substrate 12 by a vapor deposition method or the like so as to have a film thickness of about 30 nm (Step S4). Next, a dielectric film composed of polyvinylidene chloride, polyvinylidene fluoride, or the like and having a thickness in the range of, for example, about 1 to 5 µm is, for example, bonded onto the first electrode 13 with an adhesive to form a first insulating film 14 (Step S5).

Next, a sidewall electrode 32 is bonded onto the first insulating film 14 using, for example, a UV-curable adhesive (Step S6). Next, a polyvinyl alcohol resin, a polyacrylic acid resin, or the like is applied onto the first insulating film 14 and the inner wall of the sidewall electrode 32 by a spin-coating method or the like to form hydrophilic films 15 and 33 each having a thickness in the range of about 300 to 600 nm (Step S7).

Next, a first water-repellent film 16 is formed at the center of the hydrophilic film 15 (Step S8). In this step, the thickness of the first water-repellent film 16 is controlled to be substantially the same as the thickness of the hydrophilic film 15. The first water-repellent film 16 can be formed by the following method. First, the hydrophilic film 15 is formed on the entire surface of the first insulating film 14. Next, an area of the hydrophilic film 15 other than a portion where the first water-repellent film 16 is to be formed is masked. Next, the portion of the hydrophilic film 15 where the first water-repellent film 16 is to be formed is removed by etching or the like. A fluorocarbon resin or the like is then applied onto the portion from which the hydrophilic film 15 has been removed, thus forming the first water-repellent film 16. Alternatively, the following method may be employed. First, a portion of the first insulating film 14 where the first water-repellent film 16 is to be formed is masked, and a polyvinyl alcohol resin, a polyacrylic acid resin, or the like is applied thereon by a spin-coating method or the like to form the hydrophilic film 15. Next, the hydrophilic film 15 is masked, and a fluorocarbon resin or the like is then applied thereon to form the first water-repellent film 16. The first substrate portion 11 and the sidewall portion 31, and a member produced by connecting the first substrate portion 11 to the sidewall portion 31 are prepared by Steps S4 to S8 described above.

Next, the second substrate portion 21 and the member produced by connecting the first substrate portion 11 to the sidewall portion 31, which are prepared as described above, are bonded to each other using, for example, a UV-curable adhesive (Step S9). In this step, the second substrate portion 21 is bonded to the member such that the second water-repellent film 25 faces the hydrophilic film 15 (first water-repellent film 16). In this step, an accommodating chamber 40 for enclosing a first liquid 41 and a second liquid 42 is formed in the liquid iris 10.

Next, an antireflection film (not shown) is formed on a desired surface (surface on the light-incident side or the light-emitting side) of the liquid iris 10 by a vapor deposition method or the like (Step 10). For example, a multilayered antireflection film in which low-refractive index layers and high-refractive index layers are alternately stacked may be used as the antireflection film. For example, the antireflection film is formed of $LaTiO_3/SiO_2$ films or the like, and the thickness thereof is, for example, about 400 nm.

Next, the first liquid 41 and the second liquid 42 are injected into the accommodating chamber 40 from an inlet (not shown) provided through the sidewall electrode 32 using a syringe (Step S11). In this step, first, a predetermined amount of first liquid 41 is injected into the accommodating chamber 40, and the second liquid 42 is then filled in the remaining space in the accommodating chamber 40. In this step, the first liquid 41 and the second liquid 42 are filled so that air does not remain in the accommodating chamber 40. The ratio of the amount of first liquid 41 injected to the amount of second liquid 42 injected is appropriately adjusted in accordance with the degree of wettability of the first liquid 41 on the hydrophilic films 15 and 33, the degree of wettability of the second liquid 42 on the first water-repellent film 16 and the second water-repellent film 25, the diameter of the first water-repellent film 16 etc.

Next, the first electrode 13 and the second electrode 23 are connected to the selector switch 8b, and the sidewall electrodes 32 is connected to the power supply 8a (Step S12). Lastly, for example, a UV-curable adhesive is applied onto the sidewall electrode 32, and the adhesive is then cured by ultraviolet irradiation to seal the inlet of the sidewall electrode 32 (Step S13). Accordingly, the accommodating chamber 40 is hermetically sealed to seal the first liquid 41 and the second liquid 42 therein. As described above, the liquid iris 10 is produced in this embodiment.

4. Electrowetting Phenomenon

Figure 4A:
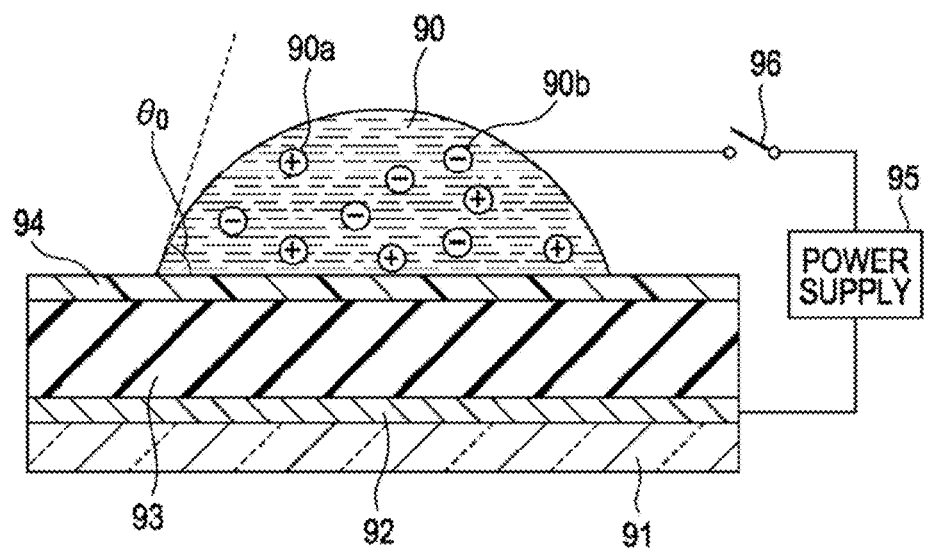
FIG. 4A is a view showing a state of a polar liquid before a voltage is applied to the polar liquid.
Figure 4B:
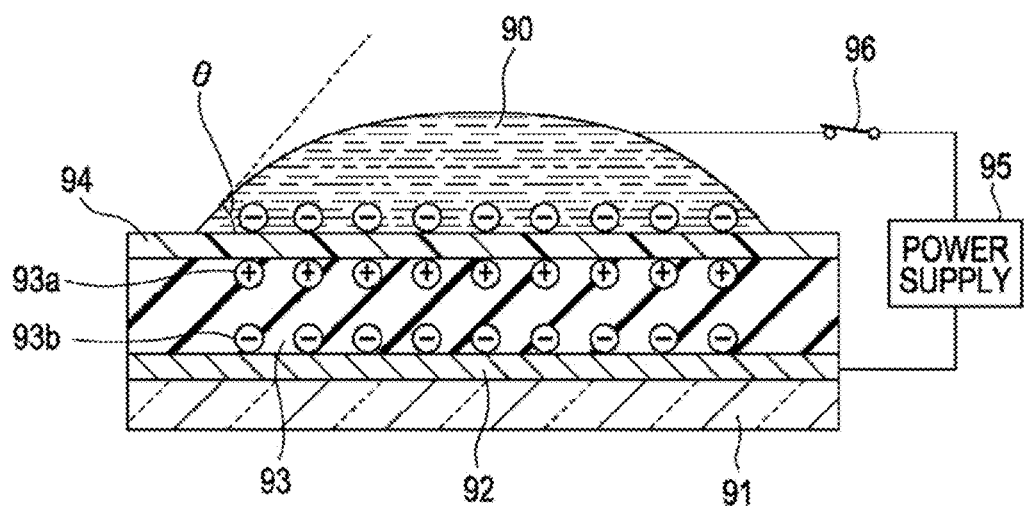
FIG. 4B is a view showing a state of the polar liquid when a voltage is applied to the polar liquid.

Before a description of a driving operation of the liquid iris 10 of this embodiment, an electrowetting phenomenon (electrocapillarity) used in the driving operation will be briefly described. FIGS. 4A and 4B are views showing the principle of the electrowetting phenomenon. FIG. 4A is a view showing a state of a polar liquid 90 when no voltage is applied to the polar liquid 90, and FIG. 4B is a view showing a state of the polar liquid 90 when a voltage is applied to the polar liquid 90.

In the example shown in FIGS. 4A and 4B, a member includes a substrate 91, an electrode 92 disposed on the substrate 91, an insulating film 93 disposed on the electrode 92, and a water-repellent film 94 (hydrophobic film) disposed on the insulating film 93. It is assumed that a polar liquid 90 (e.g., water) is dropped on the water-repellent film 94. The polar liquid 90 is connected to a terminal of a power supply 95 through a switch 96, and another terminal of the power supply 95 is connected to the electrode 92. In this example, as shown in FIG. 4A, positive ion-molecules 90a and negative ion-molecules 90b are present in the polar liquid 90.

When no voltage is applied to the polar liquid 90 (when the switch 96 is in the off-state), the surface of the polar liquid 90 becomes spherical (the state shown in FIG. 4A) because of the surface tension. In this case, the angle formed by the surface of the water-repellent film 94 and the portion of the liquid surface of the polar liquid 90 that is in contact with the water-repellent film 94, that is, the contact angle is represented by $\theta_0$.

When the switch 96 is closed and a voltage is applied to the polar liquid 90, positive charges 93a are generated on a surface of the insulating film 93 and negative charges 93b are generated on another surface thereof. In the example shown in FIGS. 4A and 4B, the positive charges 93a are generated on the polar liquid 90 side of the insulating film 93, and the negative charges 93b are generated on the electrode 92 side of the insulating film 93. In this case, an electrostatic force acts on the negative ion-molecules 90b of the polar liquid 90, and the negative ion-molecules 90b are attracted to the water-repellent film 94 on the insulating film 93. As a result, the polar liquid 90 adheres to the water-repellent film 94 in a spread-out manner (the state shown in FIG. 4B), as compared with the case where no voltage is applied (the state shown in FIG. 4A). The contact angle $\theta$ of the polar liquid 90 at that time becomes smaller than the contact angle $\theta_0$ when no voltage is applied. Specifically, the wettability of the polar liquid 90 on the water-repellent film 94 (i.e., affinity between the polar liquid 90 and the water-repellent film 94) is increased by applying the voltage. This phenomenon is referred to as an electrowetting phenomenon.

5. Operation Cycle of Liquid Iris

Figure 5:
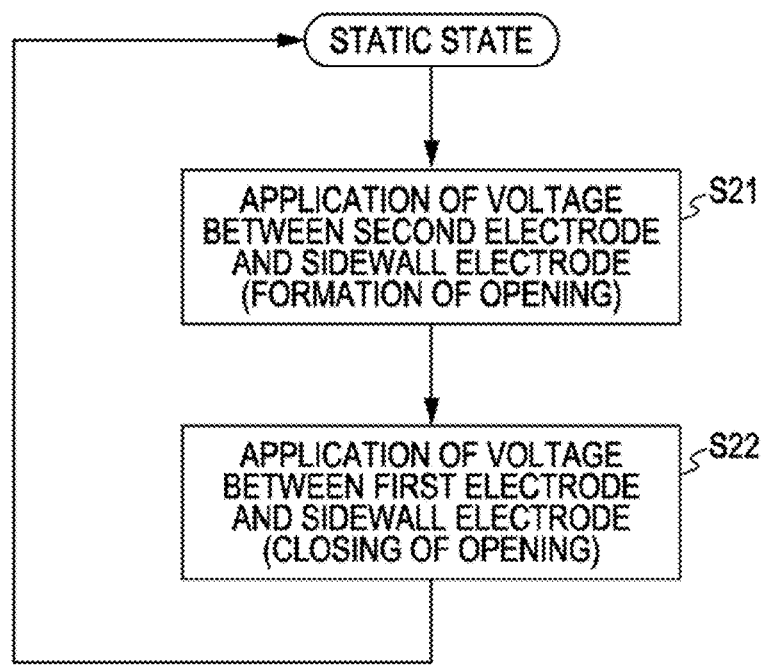
FIG. 5 is a flowchart showing a cycle of a driving operation of the liquid iris of the embodiment.

Next, the outline of an operation of driving (method of driving) the liquid iris 10 of this embodiment will now be described with reference to FIGS. 2A and 2B and FIG. 5. FIG. 5 is a flowchart showing a cycle of a driving operation of the liquid iris 10. Here, a description will be started from a state in which no voltage is applied between the first electrode 13 and the sidewall electrode 32 or between the second electrode 23 and the sidewall electrode 32 (static state). As shown in FIGS. 2A and 2B, in the static state, since the second liquid 42 is not in contact with the films at the first substrate portion 11 side, an opening is not formed.

Next, the selector switch 8b is connected to the terminal A to apply a voltage between the second electrode 23 and the sidewall electrode 32 (Step S21). Thus, the electrowetting phenomenon is caused on the second water-repellent film 25 to press the second liquid 42 onto the films on the first substrate portion 11 side. This operation forms an opening on the light-incident side of the liquid iris 10. An operation of the liquid iris 10 when the opening is formed will be described in detail below.

Next, when the opening is closed, the selector switch 8b is connected to the terminal B to apply a voltage between the first electrode 13 and the sidewall electrode 32 (Step S22). Thus, the electrowetting phenomenon is caused on the first water-repellent film 16. Consequently, the wettability of the first liquid 41 on the first water-repellent film 16 increases, and thus the first liquid 41 is made to spread over the first water-repellent film 16. As a result, an external force acts on the second liquid 42 in a direction away from the films on the first substrate portion 11 side. Thus, the operation speed in closing the opening can be increased. An operation of the liquid iris 10 when the opening is closed will be described in detail below. A predetermined time later, the selector switch 8b is turned off to return to the static state (the state shown in FIGS. 2A and 2B). Here, a description has been made of an example in which the opening is closed and the selector switch 8b is then turned off, but the embodiment is not limited thereto. Alternatively, the selector switch 8b may continue to be connected to the terminal B during closing of the opening to continuously apply a voltage between the first electrode 13 and the sidewall electrode 32.

As described above, in this embodiment, a voltage is applied in both the operation of forming an opening and the operation of closing the opening. Specifically, the opening/closing operation of the opening in the liquid iris 10 of this embodiment is performed by a both-side driving system. The use of such a driving system can improve the responsiveness of the liquid iris 10 not only in forming the opening but also in closing the opening.

Furthermore, in this embodiment, since the first water-repellent film 16 having higher affinity with the second liquid 42 than with the first liquid 41 is provided at the center of the hydrophilic film 15 of the first substrate portion 11, the first liquid 41 is repelled by the first water-repellent film 16. Accordingly, a black residue (stain) is eliminated in the opening, thus increasing the light transmittance.

6. Operation of Liquid Iris When Opening is Formed

Figure 6A:
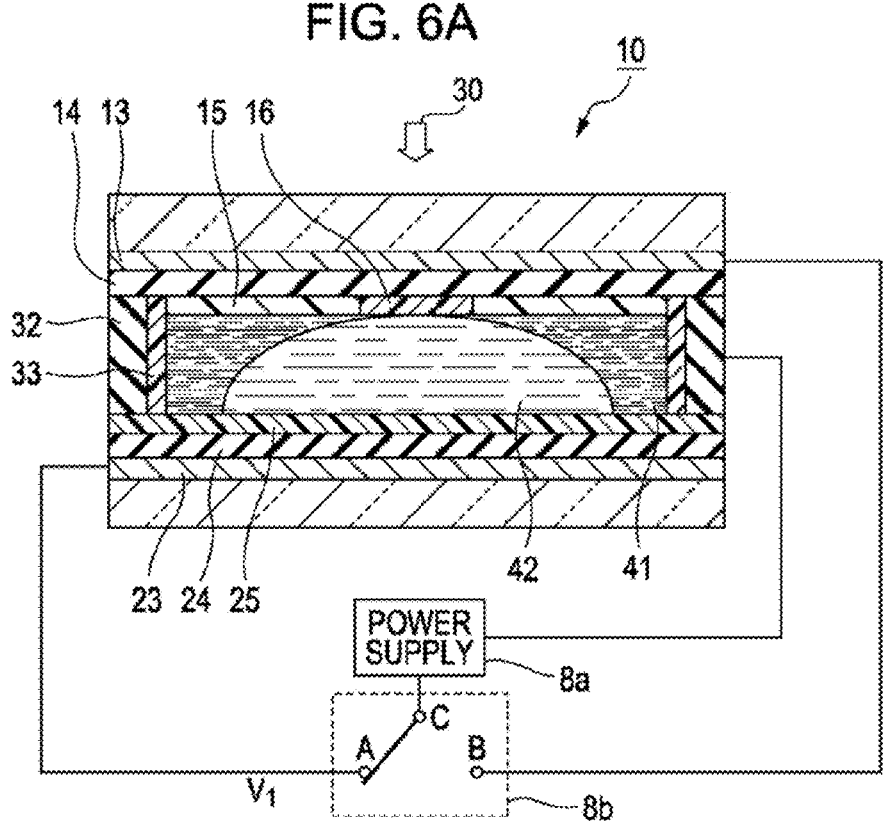
FIG. 6A is a schematic cross-sectional view of the liquid iris when an opening is formed.
Figure 6B:
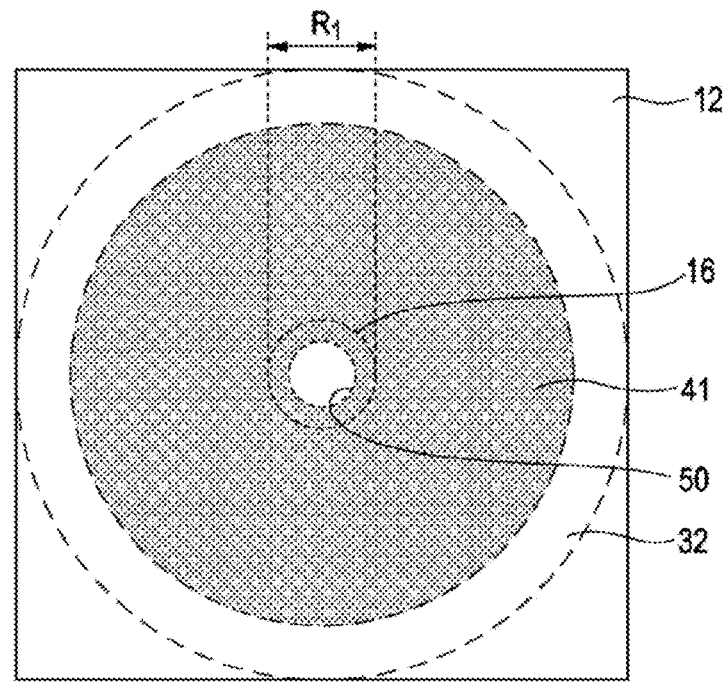
FIG. 6B is a top view of the liquid iris shown in FIG. 6A, viewed from the light-incident side when the opening is formed.

An operation of the liquid iris 10 when an opening is formed (operation in Step S21 in FIG. 5) will now be described in detail. When an opening is formed, as described above, the selector switch 8b is connected to the terminal A, and a voltage is applied between the second electrode 23 and the sidewall electrode 32. FIGS. 6A and 6B show a state of the operation.

FIGS. 6A and 6B are views showing the state of the operation of the liquid iris 10 when a voltage $V_1$ is applied between the second electrode 23 and the sidewall electrode 32. FIG. 6A is a cross-sectional view of the liquid iris 10 and FIG. 6B is a top view of the liquid iris 10 viewed from the light-incident side at that time.

When the voltage $V_1$ is applied between the second electrode 23 and the sidewall electrode 32, the shape of the interface between the first liquid 41 and the second liquid 42 is changed through electrowetting on the second water-repellent film 25 so that the second liquid 42 is pressed out to the first substrate portion 11 side. Consequently, a part of the second liquid 42 contacts a film on the first substrate portion 11 side to form a contact area between the second liquid 42 and the film on the first substrate portion It side, i.e., an opening 50 (having a circular shape) (see FIG. 6B). In the range of this opening 50, an optical path penetrating through the first substrate portion 11, the second liquid 42, and the second substrate portion 21 is formed in the liquid iris 10. Specifically, a diameter $R_1$ of the opening 50 corresponds to the aperture diameter of the liquid iris 10.

The first water-repellent film 16 having high affinity with the second liquid 42 is provided at the center of the hydrophilic film 15. Therefore, when a part of the second liquid 42 contacts the film on the first substrate portion 11 side, the part of the second liquid 42 contacts the first water-repellent film 16. Thus, the center of the opening 50 formed on the light-incident side can be located at the center of the first water-repellent film 16. That is, in this embodiment, decentration can be suppressed by the presence of the first water-repellent film 16, thereby suppressing a decrease in the resolution.

Figure 7:
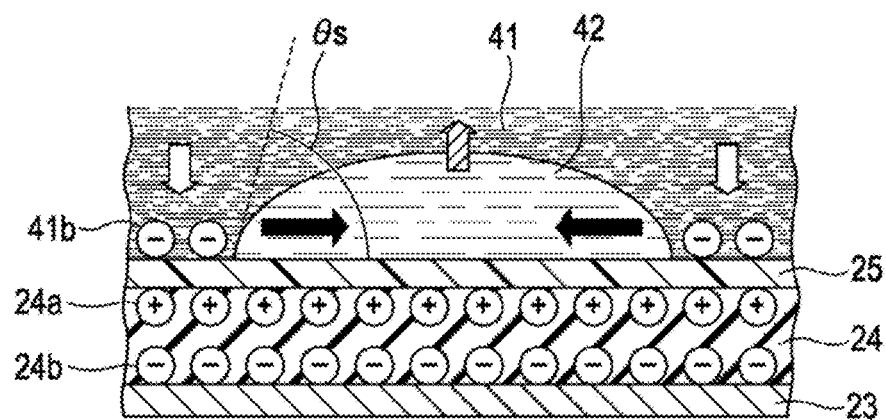
FIG. 7 is a view showing the principle of an operation of the liquid iris when the opening is formed.

With reference to FIG. 7, a description will be made of the principle that when a voltage is applied between the second electrode 23 and the sidewall electrode 32, the shape of the interface between the first liquid 41 and the second liquid 42 is changed through the electrowetting phenomenon and a part of the second liquid 42 is pressed onto a film on the first substrate portion 11 side. FIG. 7 is a view showing the principle of an operation of the liquid iris 10 when the opening 50 is formed. FIG. 7 shows only a portion near the interface between the second water-repellent film 25 and liquids. In FIG. 7, a description will be made of an example in which positive charges 24a are generated on the liquid side of the second insulating film 24, and negative charges 24b are generated on the second electrode 23 side of the second insulating film 24.

When a voltage is applied between the second electrode 23 and the sidewall electrode 32, positive charges 24a are generated on the liquid side of the second insulating film 24. In this case, an electrostatic force acts on the negative ion-molecules 41b in the first liquid 41, which is a polar liquid, and the negative ion-molecules 41b are attracted to the second water-repellent film 25 side (as shown by the white arrows in FIG. 7). Specifically, the wettability of the first liquid 41 on the second water-repellent film 25 increases. In this case, the first liquid 41 is made to spread over the second water-repellent film 25 through the electrowetting phenomenon. Consequently, a pushing force (shown by the black arrows in FIG. 7) acts to the second liquid 42 from the first liquid 41, which is present around the second liquid 42. Accordingly, the surface shape of the second liquid 42 on the first substrate portion 11 side is changed so as to be pushed towards the first substrate portion 11 (as shown by the hatched arrow in FIG. 7). As a result, a part of the surface of the second liquid 42 is pressed onto the film of the first substrate portion 11 side, and thus a circular opening 50 is formed on the light-incident side of the liquid iris 10.

An angle (contact angle) formed between the surface of the second water-repellent film 25 and the interface of the first liquid 41 and the second liquid 42 is represented by numerical expression 1 using a voltage applied etc.

$$\cos\theta_S = \cos\theta_{S0} + \frac{1}{2\gamma}\frac{\varepsilon_0\varepsilon_r}{d}V^2 \quad \text{[Numerical Expression 1]}$$

In numerical expression 1, $\theta_s$ is a contact angle of the interface when a voltage V is applied, and $\theta_{s0}$ is a contact angle of the interface when no voltage is applied (in the static state shown in FIG. 2A). Furthermore, $\varepsilon_0$ is a dielectric constant in the vacuum of $8.85 \times 10^{-12}$ (F/m), $\varepsilon_r$ is the relative dielectric constant of the second insulating film 24, V is a voltage (V) applied, d is a thickness (m) of the second insulating film 24, and γ is an interfacial tension (or interfacial energy) (N/m) between the first liquid 41 and the second liquid 42.

As is apparent from numerical expression 1, as the voltage V applied between the second electrode 23 and the sidewall electrode 32 increases, the angle $\theta_s$ formed between the surface of the second water-repellent film 25 and the interface of the first liquid 41 and the second liquid 42 also increases. This is because when the voltage V applied between the second electrode 23 and the sidewall electrode 32 increases, the wettability of the first liquid 41 on the second water-repellent film 25 increases, thereby increasing the pushing force (shown by the black arrows in FIG. 7) acting from the first liquid 41 to the second liquid 42.

FIGS. 8A and 8B and FIGS. 9A and 9B show a change in the shape of the interface between the first liquid 41 and the second liquid 42 when the voltage V applied between the second electrode 23 and the sidewall electrode 32 is increased compared with the case shown FIGS. 6A and 6B. Specifically, FIGS. 8A and 8B and FIGS. 9A and 9B show a state of a change in the opening 50 formed on the light-incident surface side of the liquid iris 10.

Figure 8A:
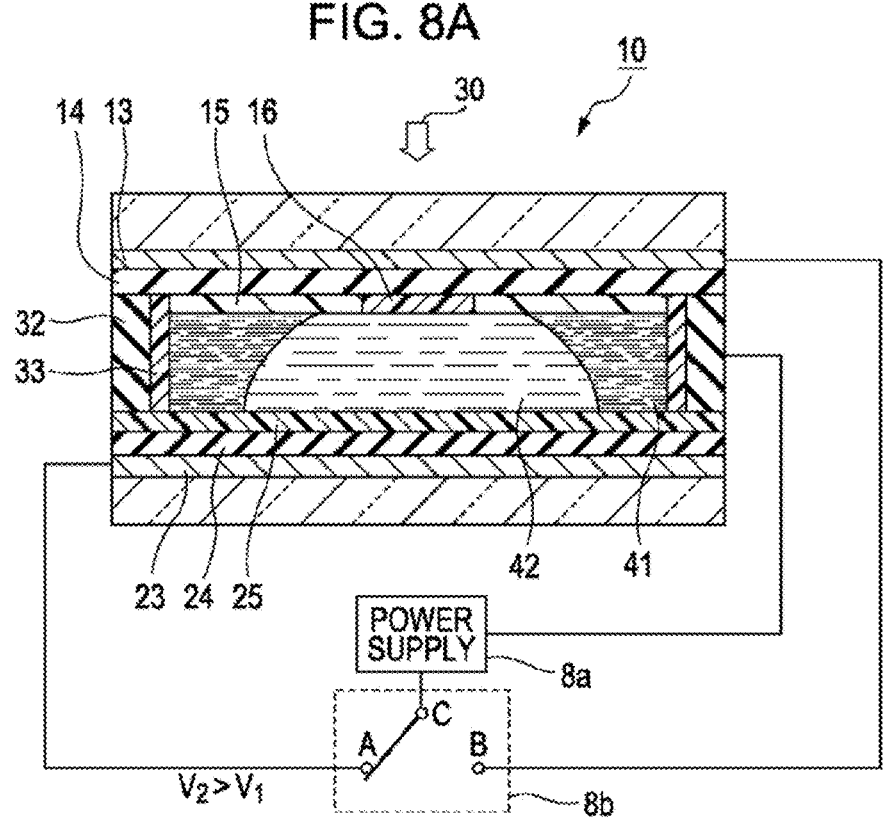
FIG. 8A is a schematic cross-sectional view of the liquid iris when an opening is formed.
Figure 8B:
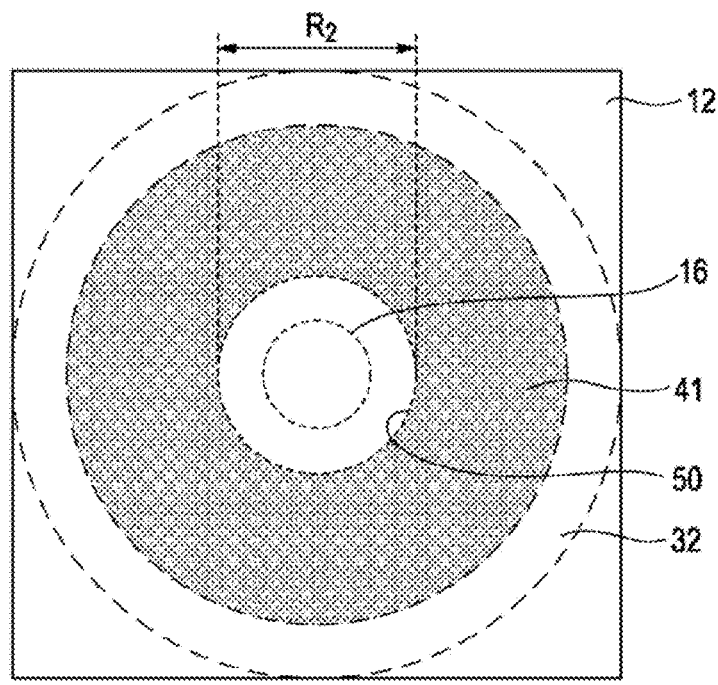
FIG. 8B is a top view of the liquid iris shown in FIG. 8A, viewed from the light-incident side when the opening is formed.
Figure 9A:
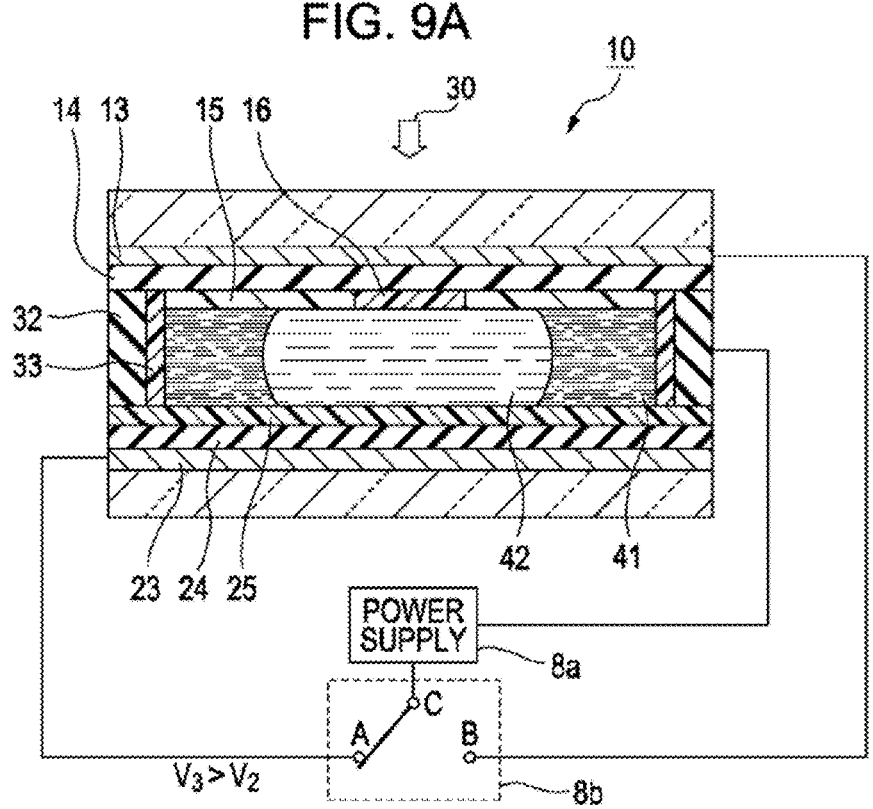
FIG. 9A is a schematic cross-sectional view of the liquid iris when an opening is formed.
Figure 9B:
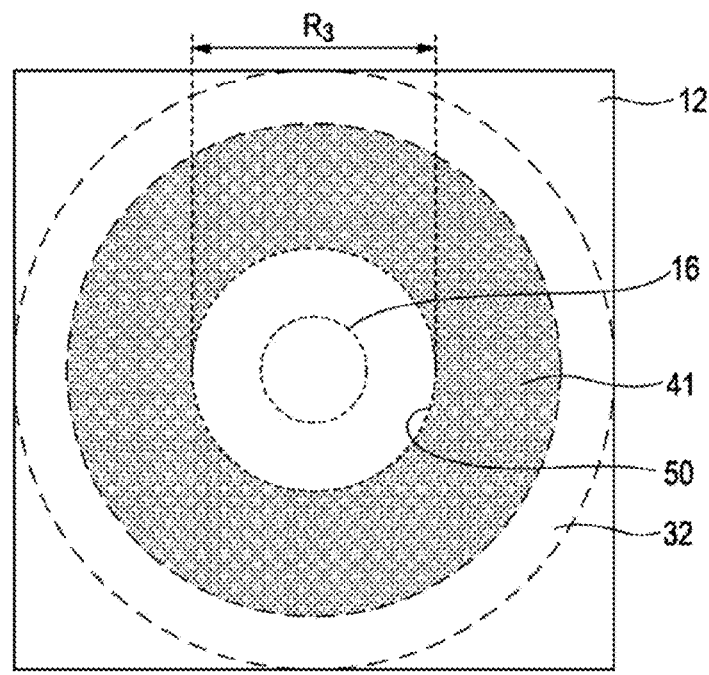
FIG. 9B is a top view of the liquid iris shown in FIG. 9A, viewed from the light-incident side when the opening is formed.

FIGS. 8A and 8B are views showing an opening state of the opening 50 when a voltage $V_2$ that is larger than the voltage $V_1$ applied in the case shown in FIGS. 6A and 6B is applied between the second electrode 23 and the sidewall electrode 32. FIG. 8A is a schematic cross-sectional view of the liquid iris 10, and FIG. 8B is a top view of the liquid iris 10 viewed from the light-incident side at that time. FIGS. 9A and 9B are views showing an opening state of the opening 50 when a voltage $V_3$ that is larger than the applied voltage $V_2$ is applied between the second electrode 23 and the sidewall electrode 32. FIG. 9A is a schematic cross-sectional view of the liquid iris 10, and FIG. 9B is a top view of the liquid iris 10 viewed from the light-incident side at that time. In FIGS. 8A and 8B and FIGS. 9A and 9B, the same components as those in FIGS. 6A and 6 B are assigned the same reference numerals.

As shown in FIGS. 6A and 6B, FIGS. 8A and 8B, and FIGS. 9A and 9B, when the voltage applied between the second electrode 23 and the sidewall electrode 32 is increased to $V_1 < V_2 < V_3$, the contact area between the second liquid 42 and films of the first substrate portion 11 side is increased and the diameter of the opening 50 is also increased to $R_1 < R_2 < R_3$. That is, in this embodiment, by changing the voltage applied, the amount of light beam 30 passing through the liquid iris 10 can be controlled.

7. Operation of Liquid Iris When Opening is Closed

Figure 10A:
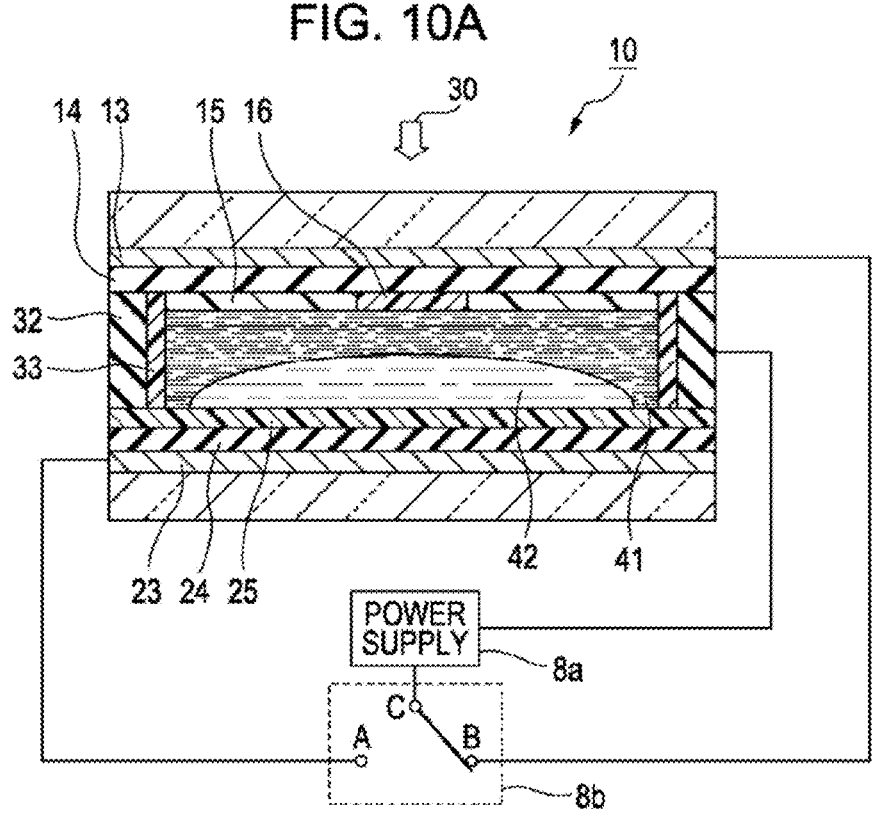
FIG. 10A is a schematic cross-sectional view of the liquid iris when the opening is closed.
Figure 10B:
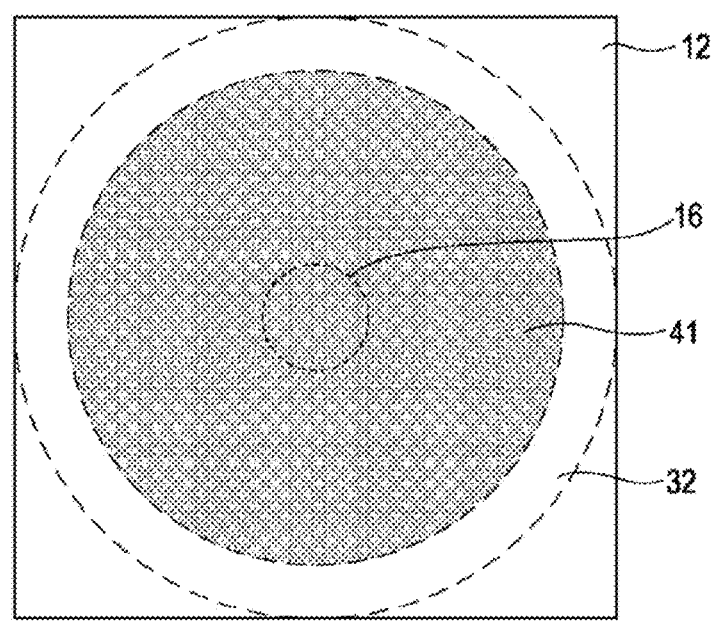
FIG. 10B is a top view of the liquid iris shown in FIG. 10A, viewed from the light-incident side when the opening is closed.

Next, an operation of the liquid iris 10 when the opening 50 is closed (operation in Step S22 in FIG. 5) will now be described in detail. When the opening 50 is closed, as described above, the selector switch 8b is connected to the terminal B, and a voltage is applied between the first electrode 13 and the sidewall electrode 32. FIGS. 10A and 10B show a state of the operation. FIGS. 10A and 10B are views showing the state of the operation of the liquid iris 10 when a voltage is applied between the first electrode 13 and the sidewall electrode 32. FIG. 10A is a cross-sectional view of the liquid iris 10, and FIG. 10B is a top view of the liquid iris 10 viewed from the light-incident side at that time.

When the opening 50 is closed, that is, when a part of the second liquid 42 that is in contact with a film on the first substrate portion 11 side of the accommodating chamber 40 is detached from the film, an electrowetting phenomenon is caused on the first water-repellent film 16 by applying a voltage between the first electrode 13 and the sidewall electrode 32.

Figure 11:
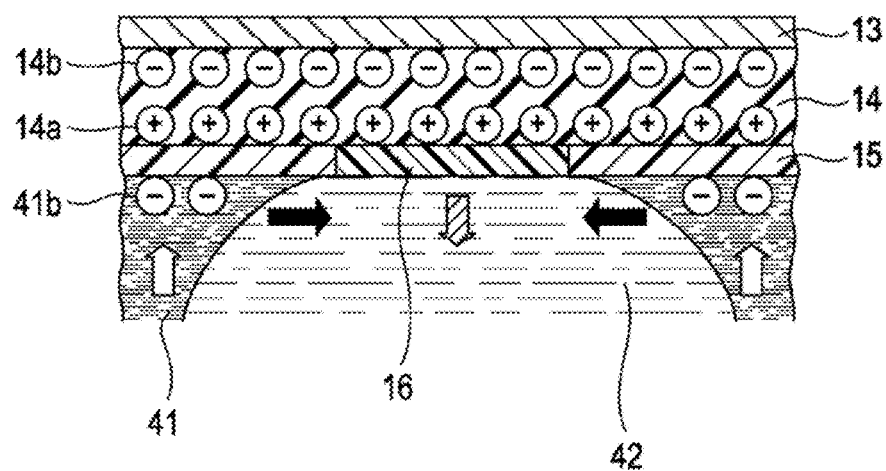
FIG. 11 is a view showing the principle of an operation of the liquid iris when the opening in closed.

With reference to FIG. 11, a description will be made of the electrowetting phenomenon caused on the first water-repellent film 16 by applying a voltage between the first electrode 13 and the sidewall electrode 32 when the opening 50 is closed. FIG. 11 is a view showing the principle of an operation of the liquid iris 10 when the opening 50 is closed. FIG. 11 shows only a portion near the interface between liquids and the first water-repellent film 16 and hydrophilic film 15. In FIG. 11, a description will be made of an example in which positive charges 14*a* are generated on the liquid side of the first insulating film 14, and negative charges 14*b* are generated on the first electrode 13 side of the first insulating film 14.

When a voltage is applied between the first electrode 13 and the sidewall electrode 32, positive charges 14*a* are generated on the liquid side of the first insulating film 14. In this case, an electrostatic force acts on the negative ion-molecules 41*b* of the first liquid 41, which is a polar liquid, and the negative ion-molecules 41*b* are attracted to the hydrophilic film 15 side (as shown by the white arrows in FIG. 11). In this case, the first liquid 41 is made to spread over the first water-repellent film 16 through the electrowetting phenomenon. Consequently, a pushing force (shown by the black arrows in FIG. 11) from the first liquid 41 disposed around the second liquid 42 acts on the second liquid 42. Because of this pushing force, a force (shown by the hatched arrow in FIG. 11) acts on a portion of the second liquid 42, which is in contact with the first water-repellent film 16, in a direction away from the first water-repellent film 16 (in the downward direction in FIG. 11).

As described above, in this embodiment, when the opening 50 is closed, not only a restoration force due to the affinity between the second liquid 42 and the first water-repellent film 16, but also the pushing force (external force) acting from the first liquid 41 to the second liquid 42 on the basis of the electrowetting phenomenon are applied to the second liquid 42. Accordingly, the operation speed when the shape of the interface between the first liquid 41 and the second liquid 42 is returned to the shape in the original static state can be increased.

8. Modifications
First Modification

Figure 12A:
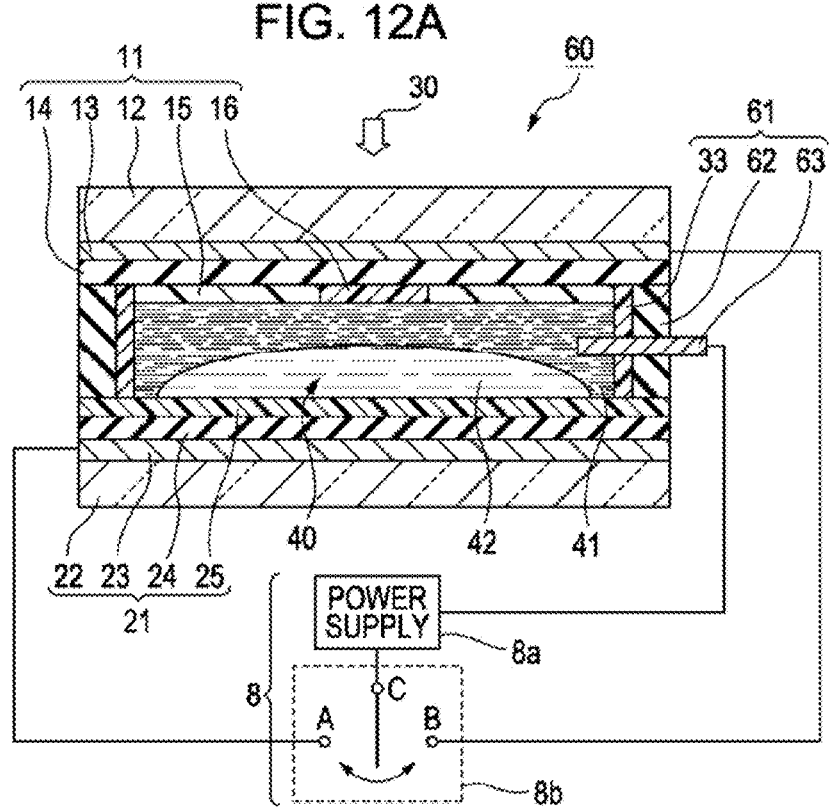
FIG. 12A is a schematic cross-sectional view of a liquid iris of a first modification.
Figure 12B:
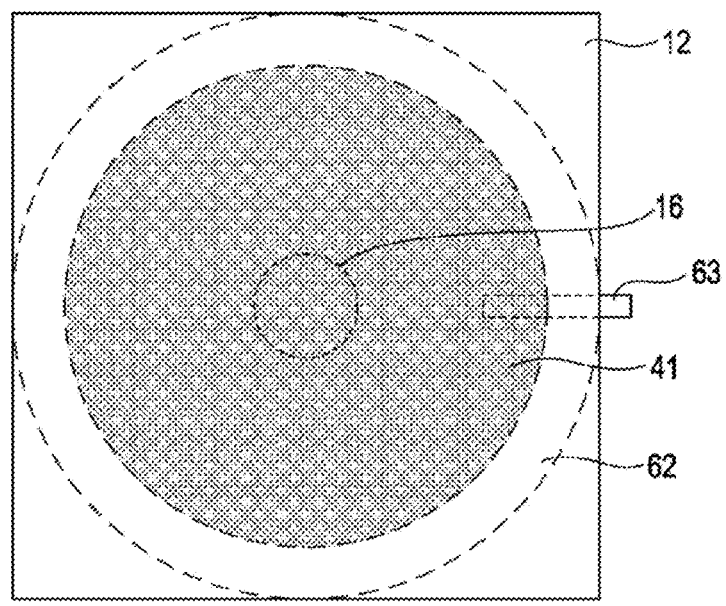
FIG. 12B is a top view of the liquid iris shown in FIG. 12A, viewed from the light-incident side.

In the above embodiment, a description has been made of an example in which a metal cylindrical member is used as a sidewall member that connects the first substrate portion 11 to the second substrate portion 21 and the sidewall member is used as an electrode. However, the embodiment of the present application is not limited thereto. For example, the sidewall member may be composed of an insulating cylindrical member, and a rod-shaped electrode composed of a metal may be inserted in the accommodating chamber 40 through the sidewall member. FIGS. 12A and 12B show an example (first modification) of a liquid iris having such a structure.

FIG. 12A is a schematic cross-sectional view of a liquid iris 60 of the first modification when no voltage is applied, and FIG. 12B is a top view of the liquid iris 60 viewed from the light-incident side at that time. In the liquid iris 60 shown in FIGS. 12A and 12B, the same components as those of the liquid iris 10 (shown in FIGS. 2A and 2B) of the above embodiment are assigned the same reference numerals.

The structure of the liquid iris 60 of the first modification is the same as that of the above embodiment except for a sidewall portion 61 of the liquid iris 60. In the liquid iris 60 of the first modification, a rod-shaped electrode 63 is inserted through a sidewall member 62 and a hydrophilic film 33, and an end of the rod-shaped electrode 63 is directly in contact with a first liquid 41. The rod-shaped electrode 63 is connected to a power supply 8*a* of a power supply unit 8. The sidewall member 62 is composed of an insulating material (e.g., glass).

Second Modification

Figure 13A:
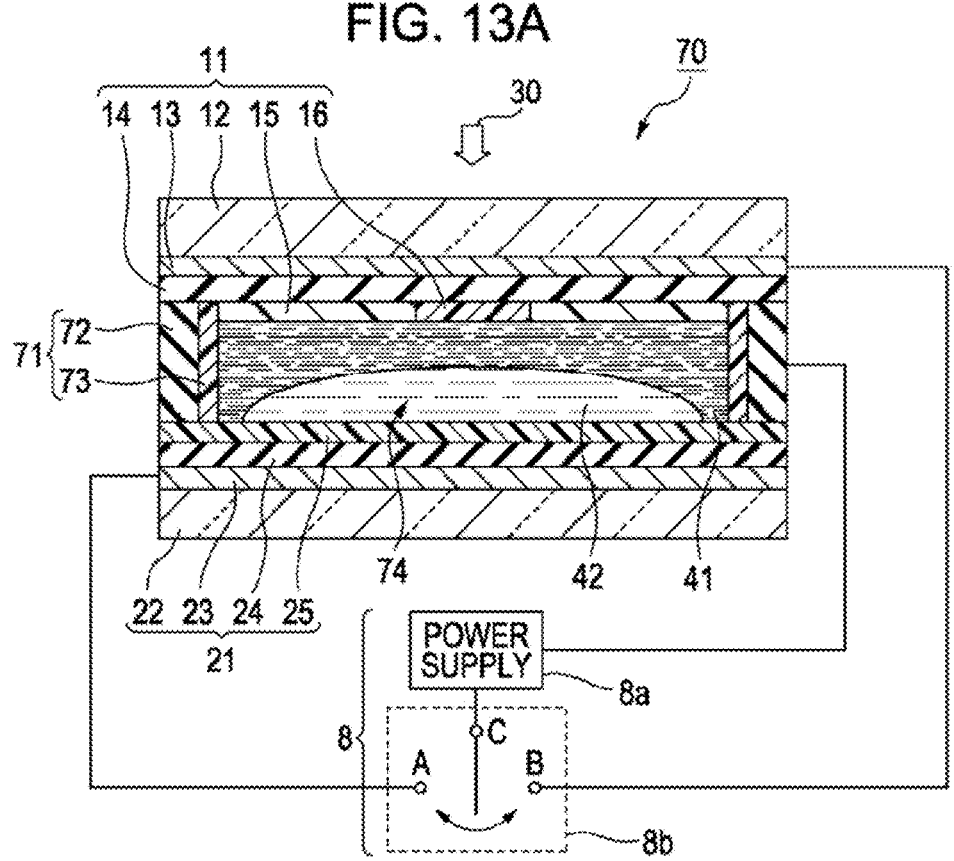
FIG. 13A is a schematic cross-sectional view of a liquid iris of a second modification.
Figure 13B:
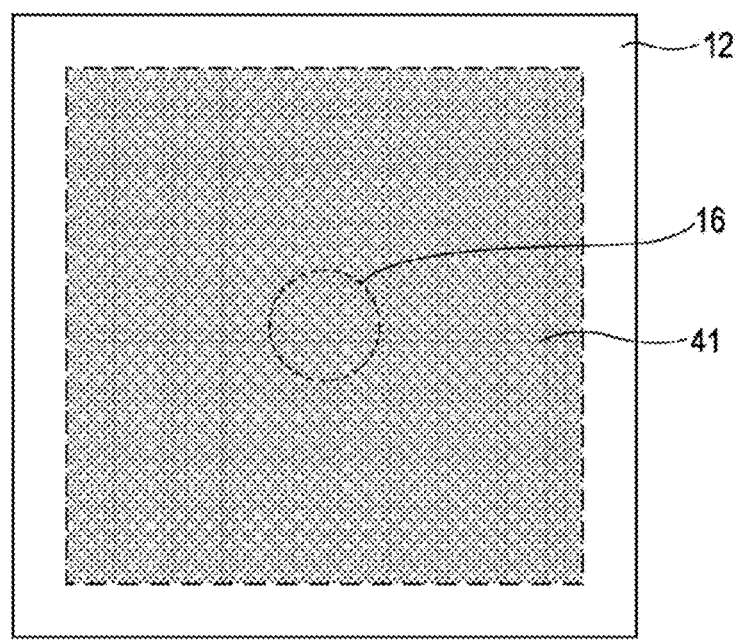
FIG. 13B is a top view of the liquid iris shown in FIG. 13A, viewed from the light-incident side.

In the above embodiment, a description has been made of an example in which a tubular metal member having an opening with a circular cross section is used as the sidewall electrode 32. However, the embodiment of the present application is not limited thereto. Any sidewall electrode may be used as long as the cross-sectional shape of the opening of the sidewall electrode 32 has point symmetry with respect to the center of the cross section of the opening. For example, the cross-sectional shape of the opening of a sidewall electrode may be a square. FIGS. 13A and 13B show an example (second modification) of a liquid iris having such a structure.

FIG. 13A is a schematic cross-sectional view of a liquid iris 70 of the second modification when no voltage is applied, and FIG. 13B is a top view of the liquid iris 70 viewed from the light-incident side at that time. In the liquid iris 70 shown in FIGS. 13A and 13B, the same components as those of the liquid iris 10 (shown in FIGS. 2A and 2B) of the above embodiment are assigned the same reference numerals.

The structure of the liquid iris 70 of the second modification is the same as that of the above embodiment except for a sidewall portion 71 of the liquid iris 70. In the liquid iris 70 of the second modification, a sidewall electrode 72 having an opening with a square cross-sectional shape is used. Accordingly, as shown in FIG. 13B, when the liquid iris 70 is viewed from the light-incident side, the shape of the portion of a colored first liquid 41 is a square.

Third Modification

Figure 14:
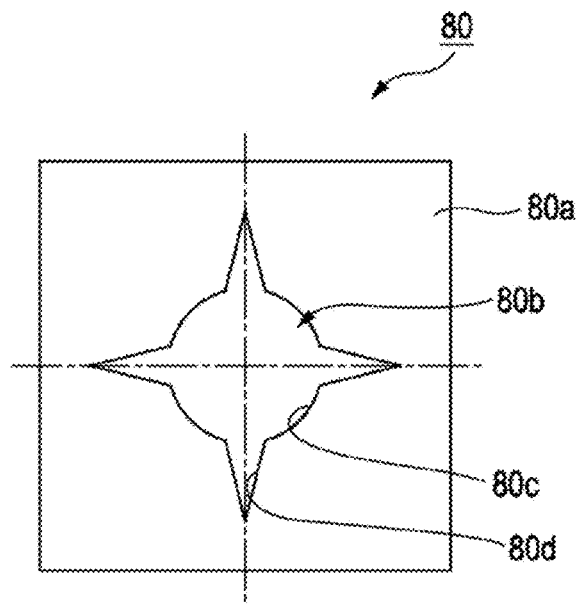
FIG. 14 is a structural view of a second electrode of a third modification.

In the above embodiment, a description has been made of an example in which the second electrode 23 is provided over the entire surface of the second substrate 22. However, the embodiment is not limited thereto. The second electrode 23 may be pattered so as to have a predetermined shape. FIG. 14 shows an example (third modification) of such a second electrode.

FIG. 14 is a schematic structural view of a second electrode of a liquid iris of the third modification. A star-shaped electrode opening 80*b* is provided at the center of an electrode portion 80*a* of a second electrode 80. The electrode portion 80*a* may be composed of the same material as the second electrode 23 of the above embodiment and may have the same thickness as that of the second electrode 23. A second substrate 22 on which the second electrode 80 is provided is exposed at the electrode opening 80*b*.

The electrode opening 80*b* includes a circular portion 80*c* disposed at the center of the second electrode 80 and four projecting portions 80*d*. The projecting portions 80*d* are separately disposed around the circumference of the circular portion 80*c* at intervals of 90 degrees, and each project from the circumference toward the outside in the shape of an inverted-V character.

The electrode opening 80*b* can be formed (patterned) as follows. First, the second electrode 80 is formed over the entire surface of the second substrate 22 as in the above embodiment. Next, a portion of the second electrode 80 corresponding to the electrode opening 80*b* is removed by a wet-etching method or the like to form the electrode opening 80 b. Alternatively, a portion of the second substrate 22 corresponding to the electrode opening 80*b* is masked, and the second electrode 80 may then be formed on the second substrate 22. The liquid iris of the third modification can be prepared as in the above embodiment except that the electrode opening 80*b* is formed as described above.

Figure 15:
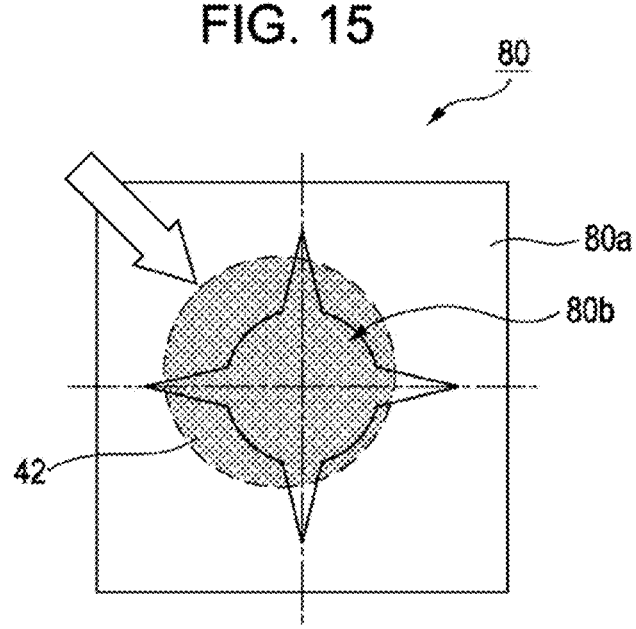
FIG. 15 is a view showing the principle of a decentration control by the second electrode of the third modification.

By providing the star-shaped electrode opening 80*b* shown in FIG. 14 at the center of the second electrode 80, an effect of suppressing decentration of the opening can be increased. FIG. 15 shows the principle of suppressing decentration of the opening.

As shown in FIG. 15, when the position of a second liquid 42 (non-polar liquid) is shifted (decentered) from the center of the second electrode 80 on the second electrode 80 having the star-shaped electrode opening 80*b* at the center thereof, an area where the second liquid 42 overlaps the electrode portion 80a becomes nonuniform (i.e., the symmetry of the area is lost).

When a voltage is applied to the liquid iris in such a state, the balance of the pushing forces acting from the first liquid 41 to the second liquid 42 due to an electrowetting phenomenon is disrupted. In this case, a force to balance the pushing forces, i.e., a restoration force (shown by the white arrow in FIG. 15) for returning the second liquid 42 to the center of the second electrode 80 acts on the second liquid 42. Accordingly, in the third modification, the restoration force acts during application of a voltage so that the second liquid 42 is located at the center of the second electrode 80, and thus decentration of the opening can be suppressed.

As described in the above embodiment, when the opening is formed, the first water-repellent film 16 provided at the center of the hydrophilic film 15 also provides an effect of suppressing decentration of the opening. Therefore, when the second electrode 80 having the structure described in the third modification is used, decentration of the opening is suppressed three-dimensionally in forming the opening, and thus the effect of suppressing decentration can be further increased.

The electrode opening of the second electrode may have any shape as long as when the second liquid 42 is located at the center of the second electrode, an area where the second liquid 42 overlaps the electrode portion is symmetric with respect to the center of the second electrode. In particular, as for the star shape of electrode opening, a plurality of projections projecting from the center to the outside are arranged in a direction around the center of the second electrode at substantially the same distance from each other (substantially the same interval).

In the embodiment and the first to third modifications, a description has been made of examples in which the present application is applied to a liquid iris, but the present application is not limited thereto. The present application can be applied also to an optical element such as a shutter or a lens. However, when the present application is applied to a lens, both the first liquid 41 and the second liquid 42 are constituted by transparent liquids, and liquids having refractive indices different from each other are used as the first liquid 41 and the second liquid 42.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical element comprising:
a first liquid having polarity or electrical conductivity;
a second liquid that is immiscible with the first liquid;
a first substrate portion including
a first substrate having optical transparency,
a first electrode disposed on a surface of the first substrate and having optical transparency,
a first insulating film disposed on the first electrode and having optical transparency,
a first film disposed on the first insulating film and having higher affinity with the first liquid than with the second liquid and optical transparency, and
a second film disposed at the center of the first film and having higher affinity with the second liquid than with the first liquid and optical transparency;
a second substrate portion including
a second substrate having optical transparency,
a second electrode disposed on a surface of the second substrate and having optical transparency,
a second insulating film disposed on the second electrode and having optical transparency, and
a third film disposed on the second insulating film and having higher affinity with the second liquid than with the first liquid and optical transparency;
a sidewall portion including a third electrode and connecting the first substrate portion to the second substrate portion so that the first film and the third film face each other; and
an accommodating portion constituted by the first substrate portion, the second substrate portion, and the sidewall portion and sealing the first liquid and the second liquid therein.

2. The optical element according to claim 1, wherein the light transmittance of the first liquid is lower than the light transmittance of the second liquid, and the refractive index of the first liquid is the same as the refractive index of the second liquid.

3. The optical element according to claim 1, wherein the thickness of the first film is the same as the thickness of the second film.

4. The optical element according to claim 1, further comprising:
a fourth film disposed on a surface of the sidewall portion, the surface being adjacent to the accommodating portion, and having higher affinity with the first liquid than with the second liquid.

5. The optical element according to claim 1, wherein the third electrode is a tubular electrode, and the first substrate portion is connected to the second substrate portion with the third electrode therebetween.

6. The optical element according to claim 1, wherein the third electrode is a rod-shaped electrode, and an end of the third electrode is in contact with the first liquid in the accommodating portion.

7. The optical element according to claim 1, wherein the surface of the second film at the accommodating portion side is circular in shape.

8. The optical element according to claim 1, wherein a star-shaped opening is provided at the center of the second electrode.

9. An imaging device comprising:
an optical element including
a first liquid having polarity or electrical conductivity,
a second liquid that is immiscible with the first liquid,
a first substrate portion including
a first substrate having optical transparency,
a first electrode disposed on a surface of the first substrate and having optical transparency,
a first insulating film disposed on the first electrode and having optical transparency,
a first film disposed on the first insulating film and having higher affinity with the first liquid than with the second liquid and optical transparency, and
a second film disposed at the center of the first film and having higher affinity with the second liquid than with the first liquid and optical transparency,
a second substrate portion including
a second substrate having optical transparency,
a second electrode disposed on a surface of the second substrate and having optical transparency,
a second insulating film disposed on the second electrode and having optical transparency, and a third film disposed on the second insulating film and having higher affinity with the second liquid than with the first liquid and optical transparency, a sidewall portion including a third electrode and connecting the first substrate portion to the second substrate portion so that the first film and the third film face each other, and an accommodating portion constituted by the first substrate portion, the second substrate portion, and the sidewall portion and sealing the first liquid and the second liquid therein;

a power supply unit configured to apply a voltage between the first electrode and the third electrode or between the second electrode and the third electrode of the optical element;

a lens unit configured to focus incident light; and an imaging element on which the incident light is focused through the optical element and the lens unit.

10. A method of driving an optical element including a first liquid having polarity or electrical conductivity; a second liquid that is immiscible with the first liquid; a first substrate portion including a first substrate having optical transparency, a first electrode disposed on a surface of the first substrate and having optical transparency, a first insulating film disposed on the first electrode and having optical transparency, a first film disposed on the first insulating film and having higher affinity with the first liquid than with the second liquid having optical transparency, and a second film disposed at the center of the first film and having higher affinity with the second liquid than with the first liquid and optical transparency; a second substrate portion including a second substrate having optical transparency, a second electrode disposed on a surface of the second substrate and having optical transparency, a second insulating film disposed on the second electrode and having optical transparency, and a third film disposed on the second insulating film and having higher affinity with the second liquid than with the first liquid and optical transparency; a sidewall portion including a third electrode and connecting the first substrate portion to the second substrate portion so that the first film and the third film face each other; and an accommodating portion constituted by the first substrate portion, the second substrate portion, and the sidewall portion and sealing the first liquid and the second liquid therein, the method comprising the steps of:

applying a voltage between the second electrode and the third electrode of the optical element to change the shape an interface between the first liquid and the second liquid: and applying a voltage between the first electrode and the third electrode to return the changed shape of the interface between the first liquid and the second liquid to the original shape.

* * * * *